(12) United States Patent
Francis

(10) Patent No.: US 10,858,823 B2
(45) Date of Patent: Dec. 8, 2020

(54) MULTI-PURPOSE ADJUSTABLE BRACKET ASSEMBLY

(71) Applicant: Daniel Marchell Francis, Falls Church, VA (US)

(72) Inventor: Daniel Marchell Francis, Falls Church, VA (US)

(*) Notice: Subject to any disclaimer, the term of this patent is extended or adjusted under 35 U.S.C. 154(b) by 0 days.

(21) Appl. No.: 16/296,858

(22) Filed: Mar. 8, 2019

(65) Prior Publication Data

US 2019/0277022 A1 Sep. 12, 2019

Related U.S. Application Data

(60) Provisional application No. 62/761,036, filed on Mar. 9, 2018.

(51) Int. Cl.

| F16M 13/00 | (2006.01) |
| E04B 1/41 | (2006.01) |
| F16B 2/06 | (2006.01) |
| E04B 1/00 | (2006.01) |
| F16M 13/02 | (2006.01) |
| E04F 10/00 | (2006.01) |
| E04B 1/38 | (2006.01) |

(52) U.S. Cl.
CPC .............. *E04B 1/40* (2013.01); *E04B 1/003* (2013.01); *F16B 2/065* (2013.01); *F16M 13/022* (2013.01); *E04B 2001/405* (2013.01); *E04F 10/00* (2013.01)

(58) Field of Classification Search
CPC ..... F16M 13/02; F16M 13/022; F16M 11/041
USPC ... 248/220.21, 220.22, 229.2, 226.11, 228.1, 248/230.1, 229.1
See application file for complete search history.

(56) References Cited

U.S. PATENT DOCUMENTS

| 3,213,183 | A | * | 10/1965 | Weimer | ................. | H02G 5/06 |
| | | | | | | 174/33 |
| 5,961,242 | A | * | 10/1999 | Leone | ................. | E04H 17/1421 |
| | | | | | | 248/228.1 |
| 2004/0041141 | A1 | * | 3/2004 | Cannon | ................. | E04G 21/3223 |
| | | | | | | 256/65.05 |
| 2015/0047177 | A1 | * | 2/2015 | Jolley | ................. | H01L 31/042 |
| | | | | | | 29/469 |
| 2016/0111999 | A1 | * | 4/2016 | Stapleton | ................. | F24S 25/634 |
| | | | | | | 52/173.3 |
| 2017/0241125 | A1 | * | 8/2017 | Higgins | ................. | E04H 9/00 |

* cited by examiner

*Primary Examiner* — Steven M Marsh
(74) *Attorney, Agent, or Firm* — Maier & Maier, PLLC

(57) ABSTRACT

A multi-purpose, adjustable bracket assembly may be provided. The adjustable bracket may allow for attaching structural features to existing posts, beams, or supports. The adjustable bracket may, for example, facilitate attaching a privacy screen and/or awning to existing railing posts of a deck or balcony. The bracket may further facilitate attachment of decorative latticework, horizontal slats, and/or bamboo partitions.

9 Claims, 12 Drawing Sheets

MULTI-PURPOSE ADJUSTABLE BRACKET ASSEMBLY

CROSS-REFERENCE TO RELATED APPLICATIONS

This application claims priority from U.S. Provisional Patent Application No. 62/761,036, filed on Mar. 9, 2018, entitled "Multi-purpose adjustable bracket assembly," the entire contents of which are hereby incorporated by reference.

BACKGROUND

Privacy screens, shades, awnings, decorative features, and other structural elements are often added to decks and balconies. Traditionally, these structures are secured in or by a weighted anchor, such as a large planter, or they are permanently affixed to the deck, balcony, house or underlying structure. Using weight anchors, such as a planter, typically require a large footprint and can be inconvenient and difficult to move. Permanent fixation similarly is undesirable as it can decrease home value and leave permanent evidence on core structural features of a home. Furthermore, HOA restrictions often limit the ability for permanently attaching such structures. Multi-folding panel screens have been developed to address some of these traditional concerns; however, the multi-folding panel screens are lightweight and have a tendency to collapse under the strain of wind.

It therefore may be desirable to attach a privacy screen or other structure in a manner that does not impede on useful space and that can be easily attached or removed in a safe and secure manner.

SUMMARY

According to an exemplary embodiment a multi-purpose, adjustable bracket assembly may be provided. The adjustable bracket may include a frame. A first clamping section with a first channel disposed therethrough may have a perimeter defined by the frame. The frame may be separable along the perimeter of the first clamping section. A second clamping section having a second channel disposed therethrough may have a perimeter defined by the frame. Lastly, a narrowing element may be adjustably positioned within the second channel.

According to another exemplary embodiment, an adjustable bracket arrangement for attaching auxiliary structure to an existing post may be provided. The adjustable bracket arrangement may include at least one multi-purpose adjustable bracket. The adjustable bracket may include a frame. A first clamping section with a first channel disposed therethrough may have a perimeter defined by the frame. The frame may be separable along the perimeter of the first clamping section. A second clamping section having a second channel disposed therethrough may have a perimeter defined by the frame. Lastly, a narrowing element may be adjustably positioned within the second channel.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

DETAILED DESCRIPTION

Figure 1:
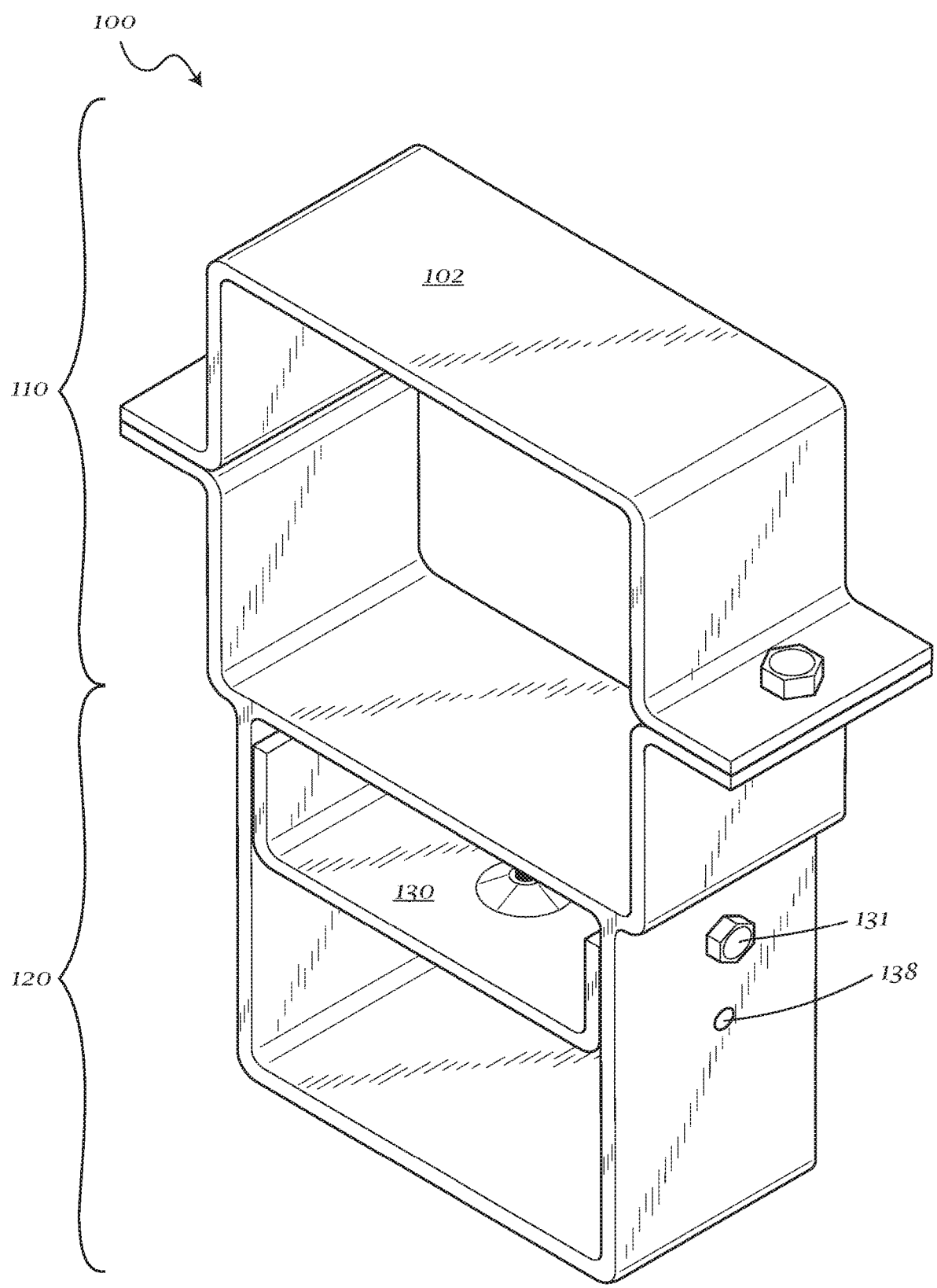
FIG. 1 shows a multi-purpose adjustable bracket assembly;
Exemplary
Figure 2:
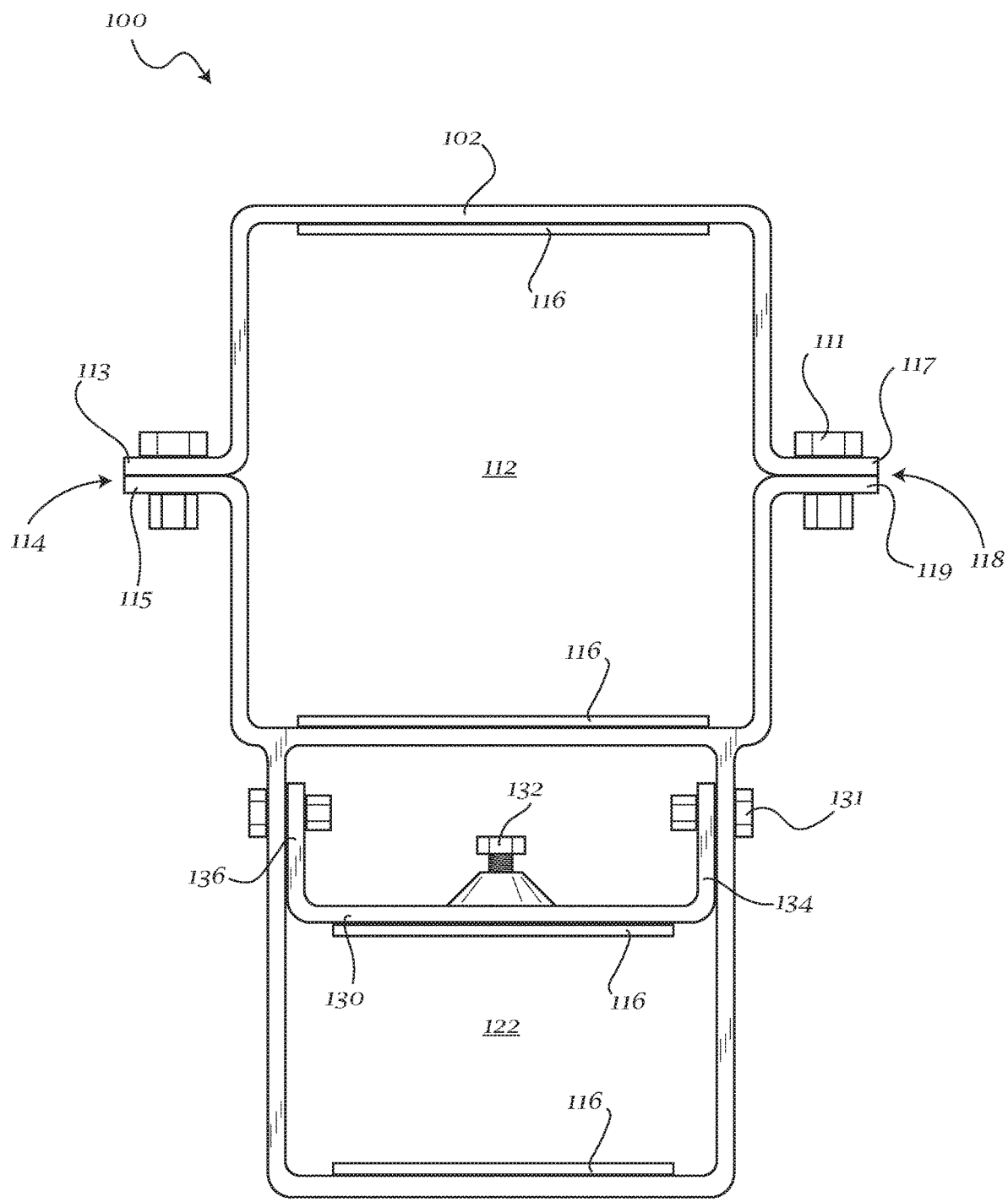
FIG. 2 shows a multi-purpose adjustable bracket assembly;
Exemplary
Figure 3:
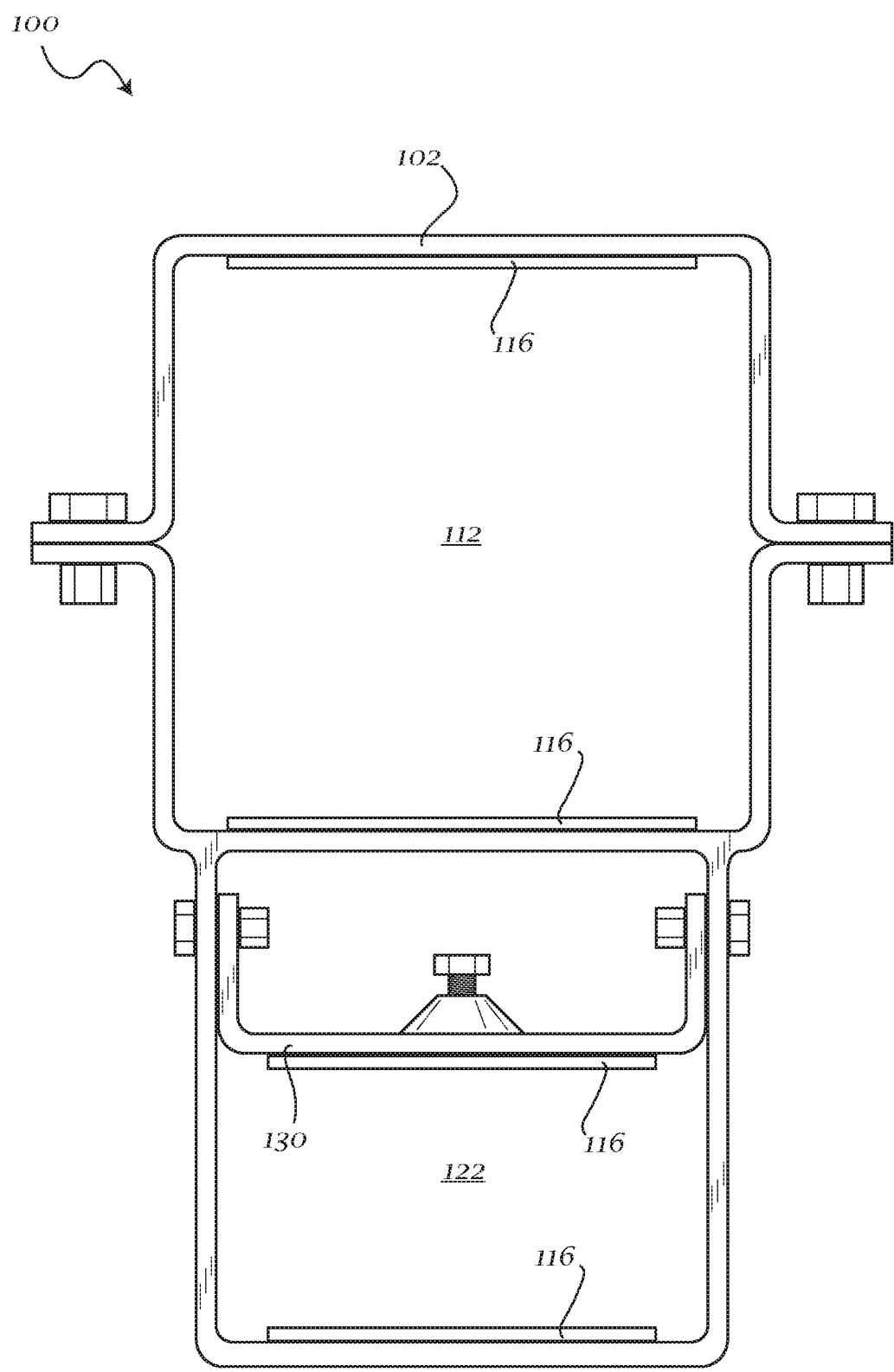
FIG. 3 shows a multi-purpose adjustable bracket assembly;
Exemplary
Figure 4:
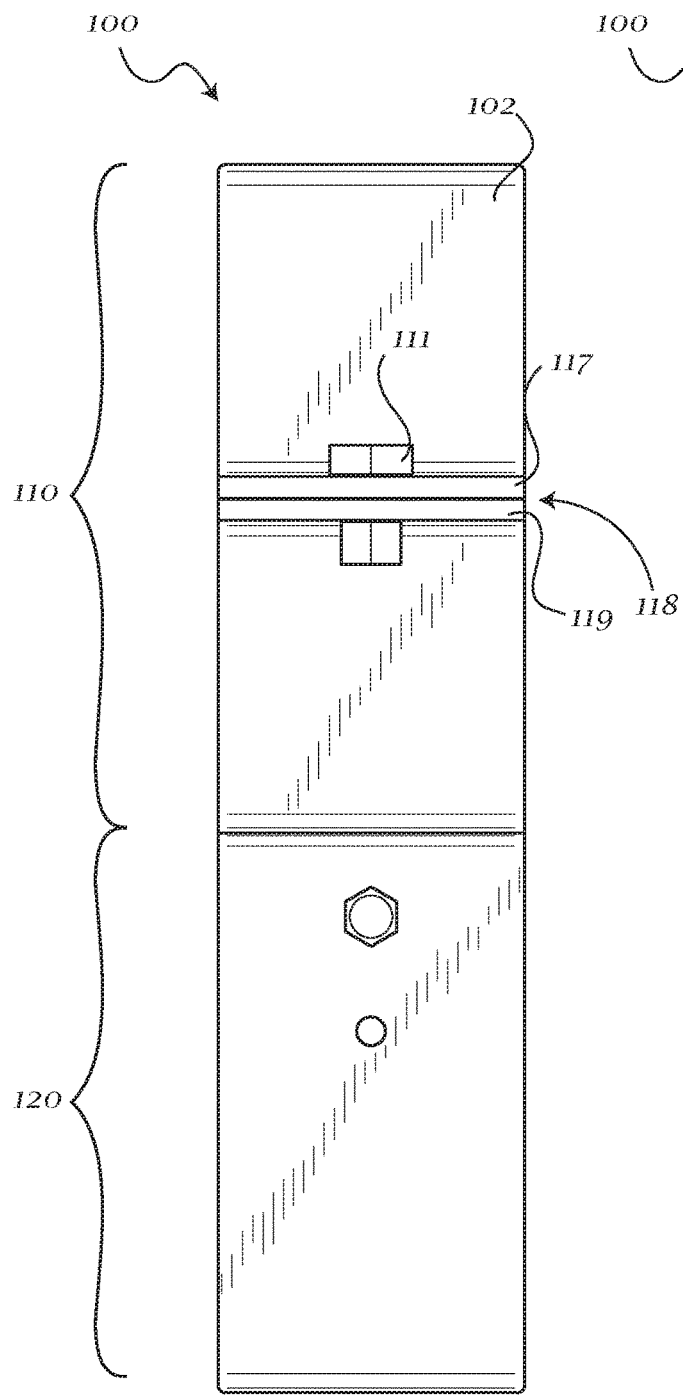
FIG. 4 shows a multi-purpose adjustable bracket assembly;
Exemplary
Figure 5:
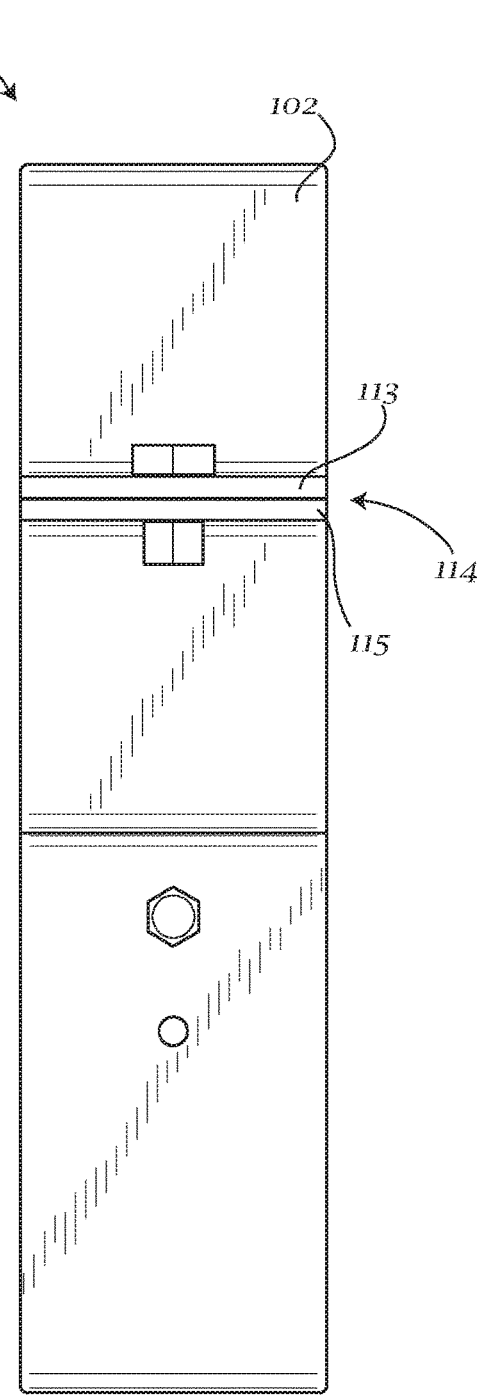
FIG. 5 shows a multi-purpose adjustable bracket assembly;
Exemplary
Figure 6:
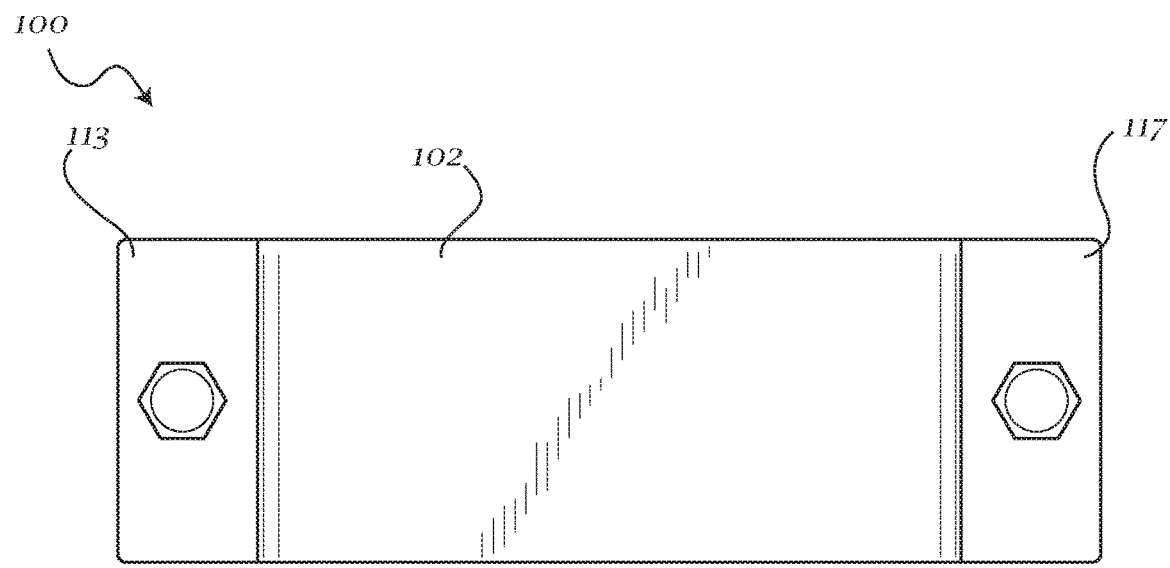
FIG. 6 shows a multi-purpose adjustable bracket assembly;
Exemplary
Figure 7:
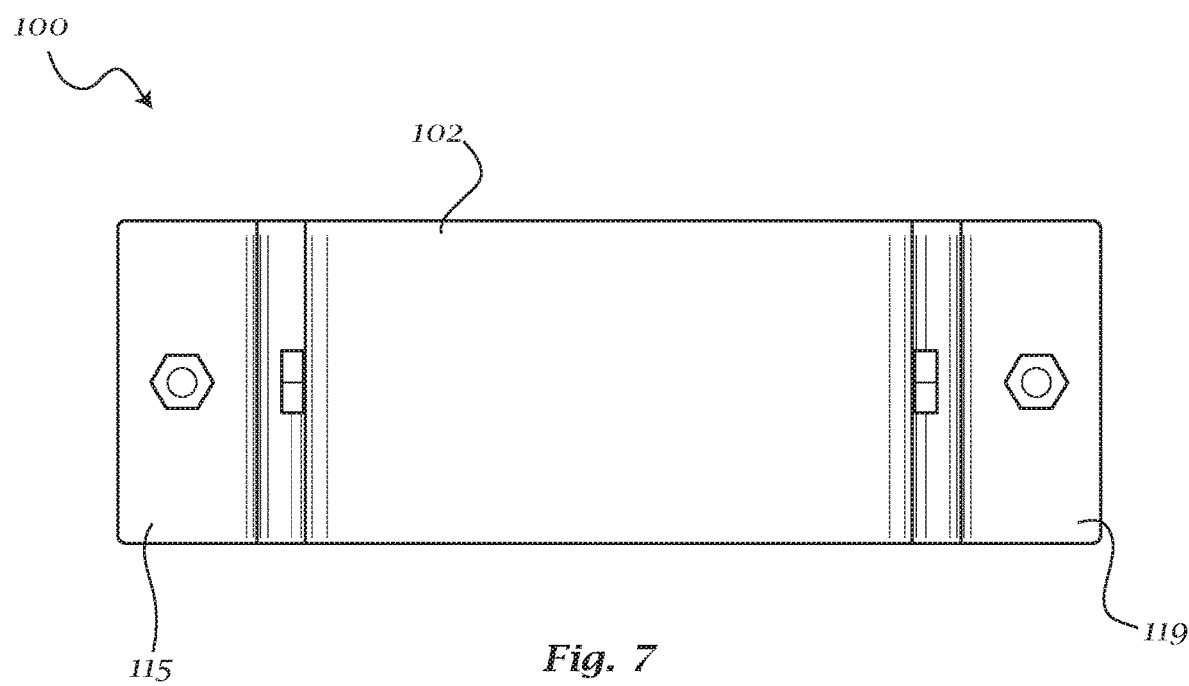
FIG. 7 shows a multi-purpose adjustable bracket assembly;
Exemplary
Figure 8:
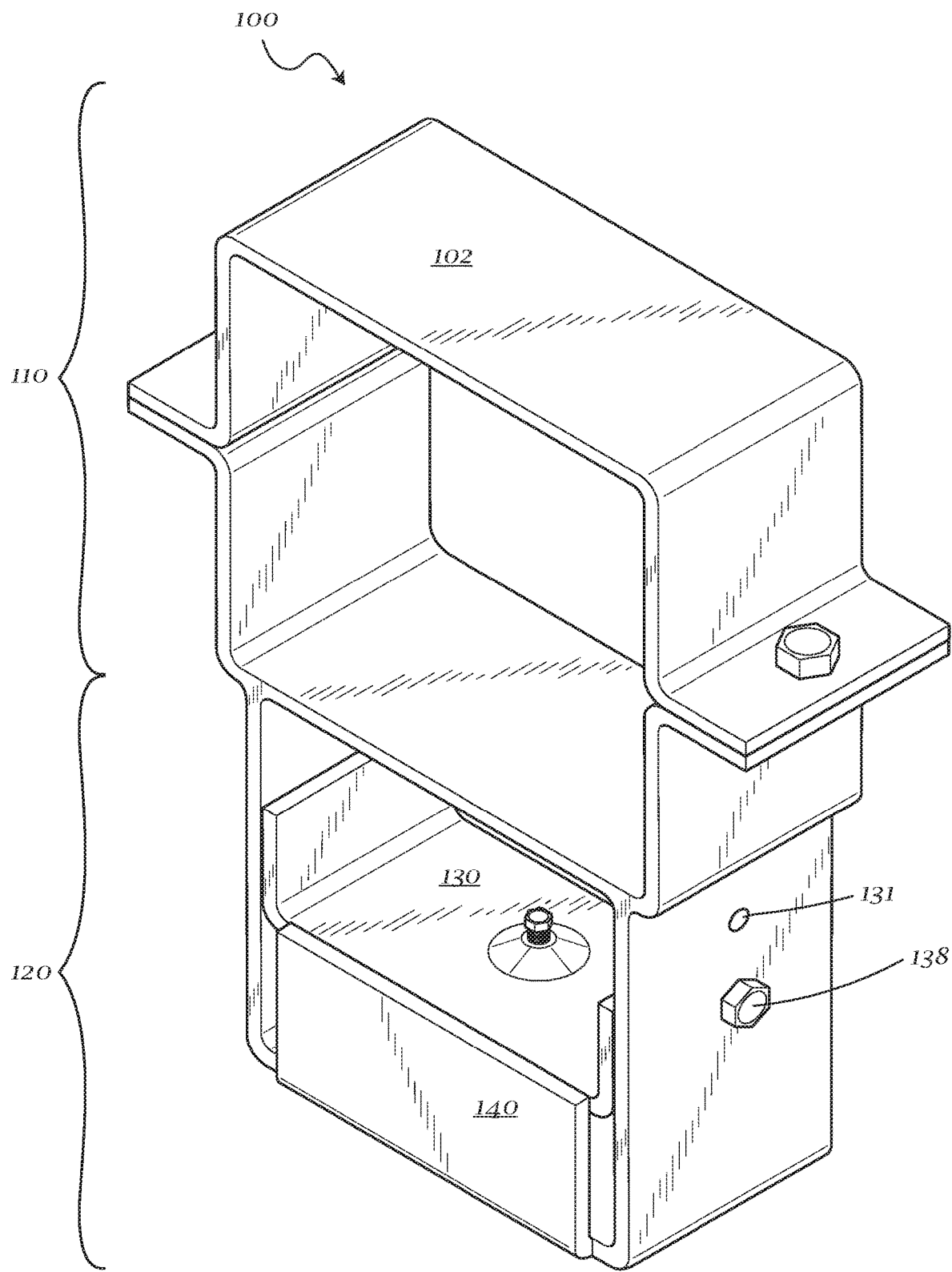
FIG. 8 shows a multi-purpose adjustable bracket assembly;
Exemplary
Figure 9:
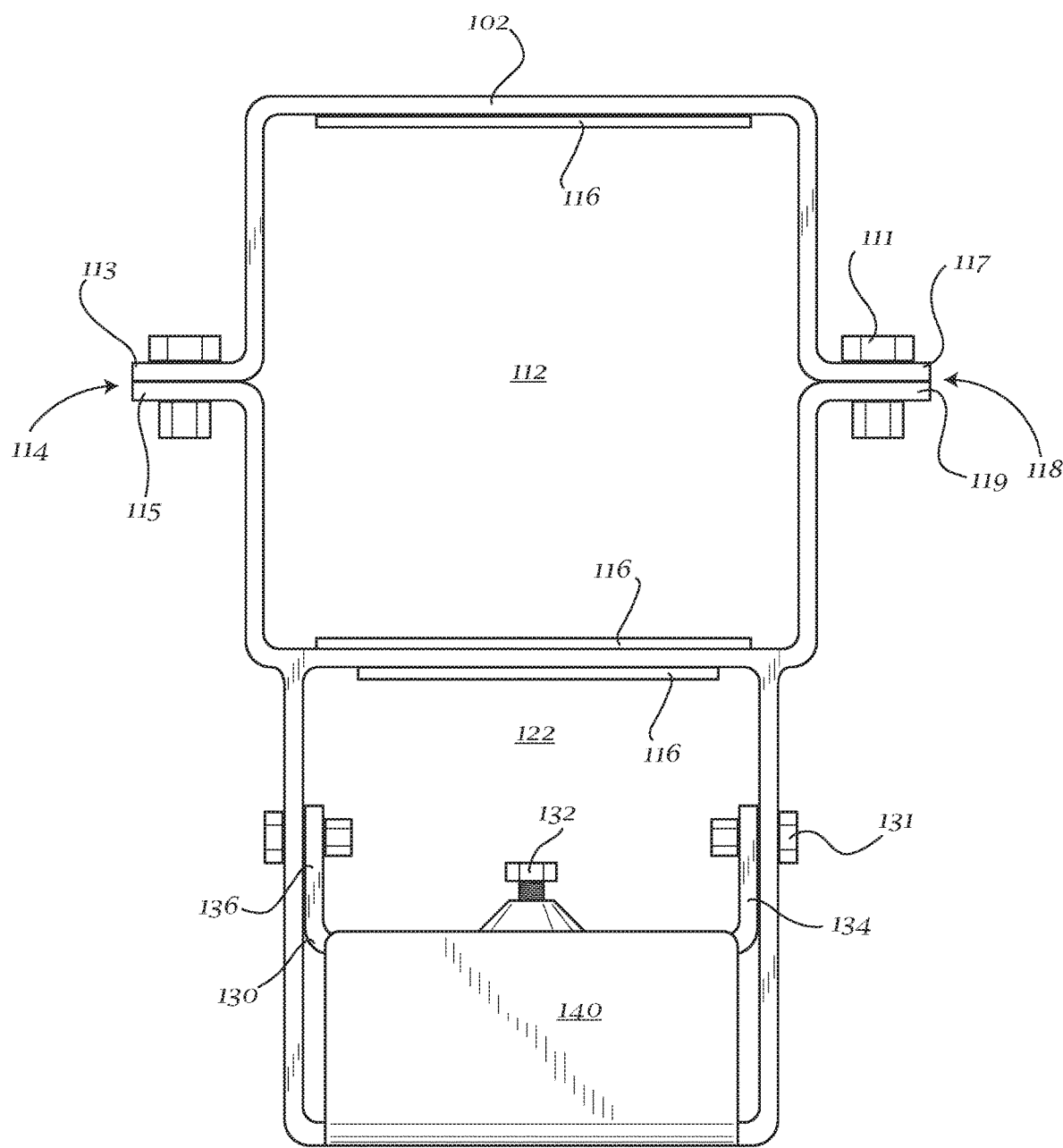
FIG. 9 shows a multi-purpose adjustable bracket assembly;
Exemplary
Figure 10:
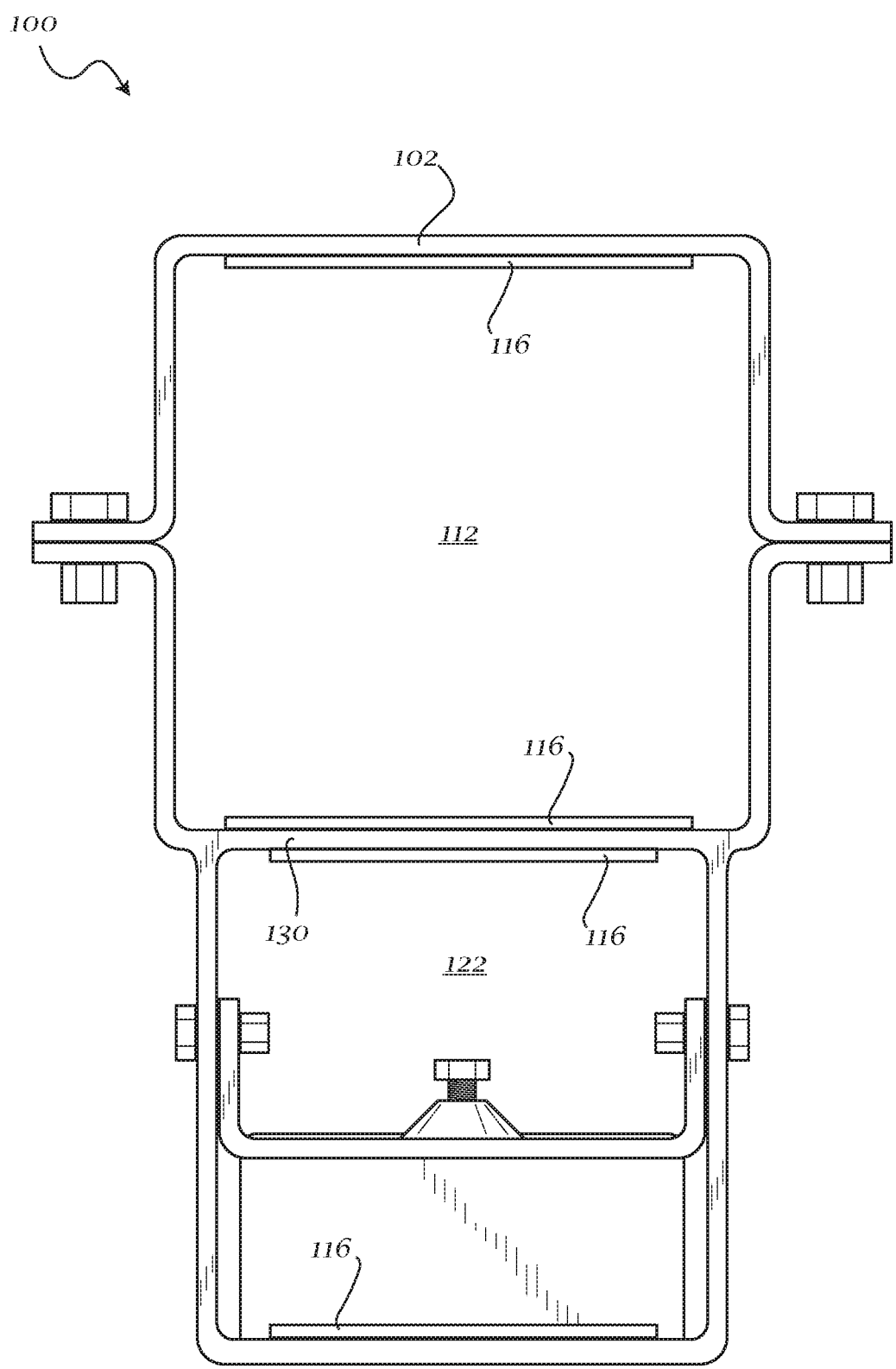
FIG. 10 shows a multi-purpose adjustable bracket assembly;
Exemplary
Figure 11:
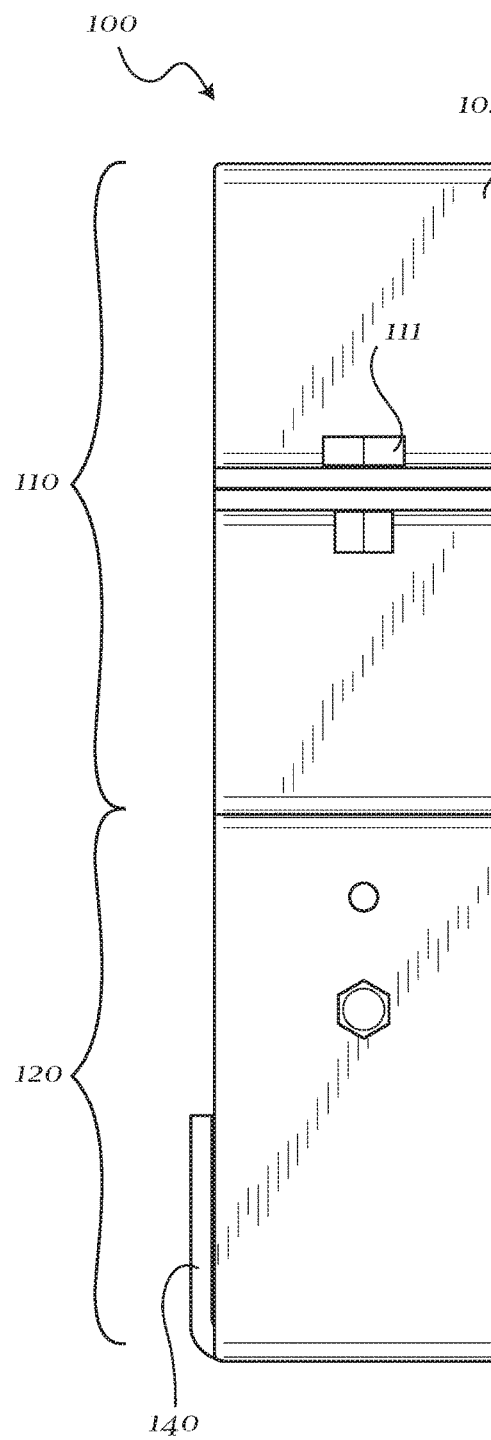
FIG. 11 shows a multi-purpose adjustable bracket assembly;
Exemplary
Figure 12:
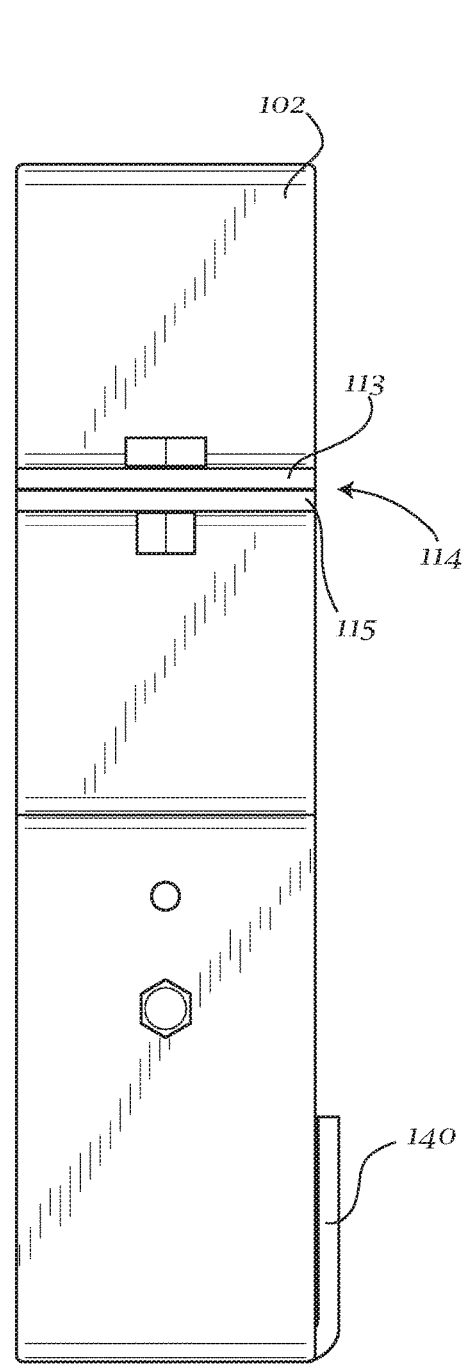
FIG. 12 shows a multi-purpose adjustable bracket assembly;
Exemplary
Figure 13:
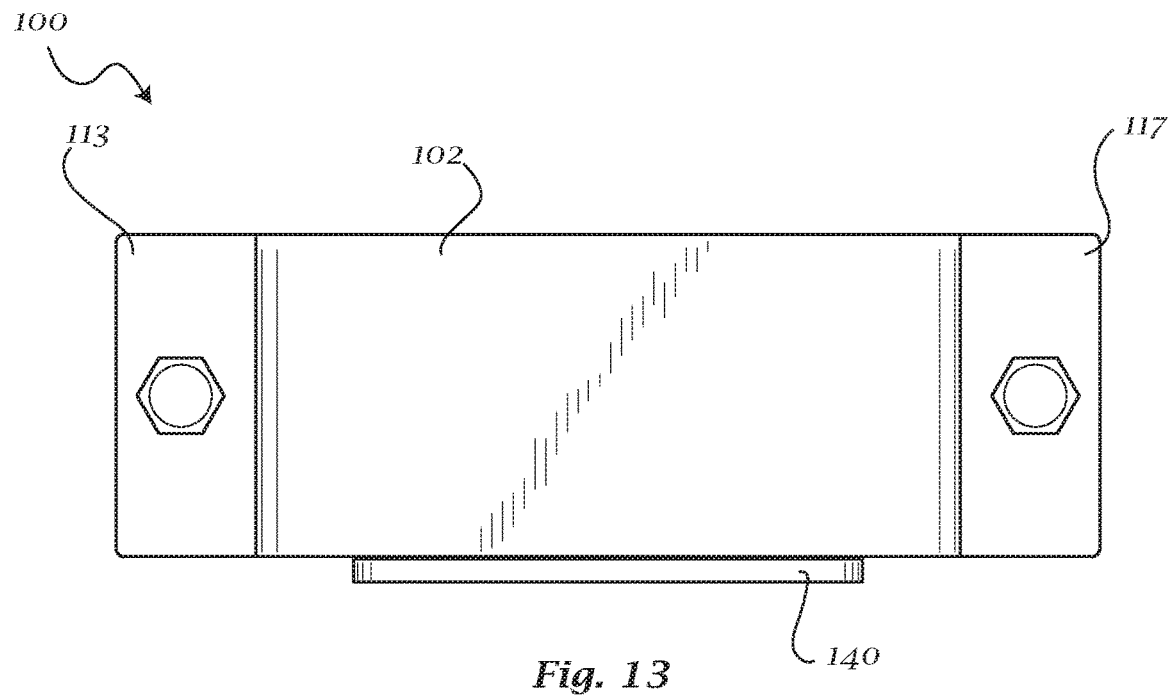
FIG. 13 shows a multi-purpose adjustable bracket assembly;
Exemplary
Figure 14:
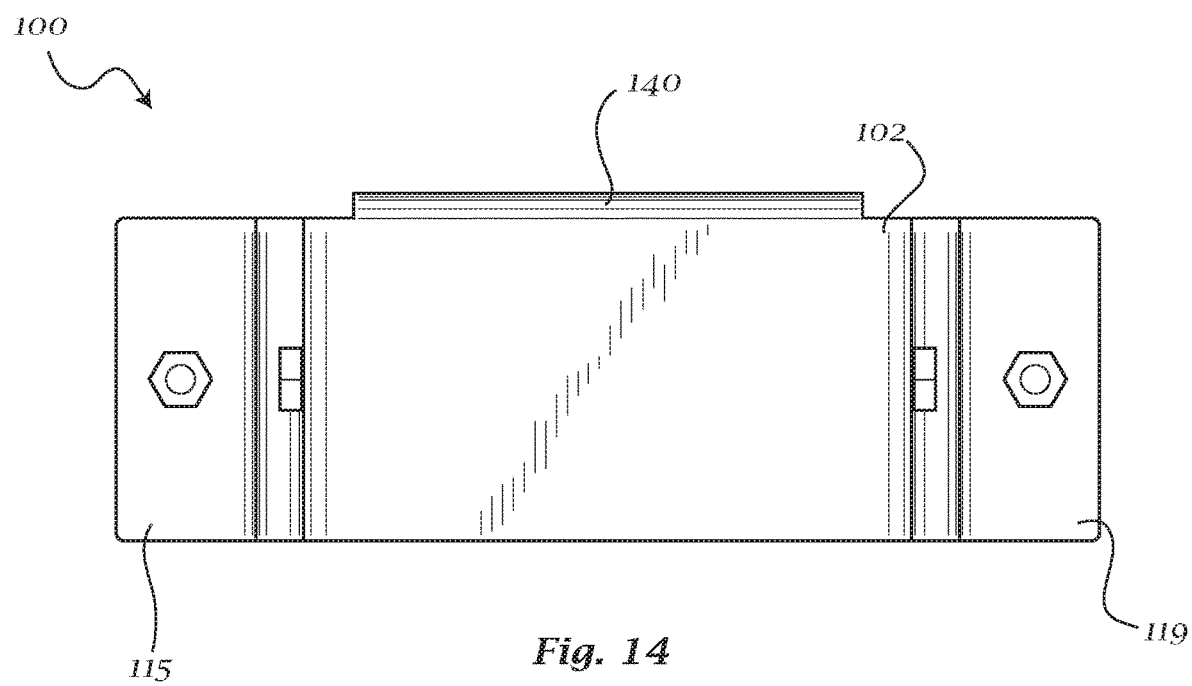
FIG. 14 shows a multi-purpose adjustable bracket assembly;
Exemplary
Figure 15:
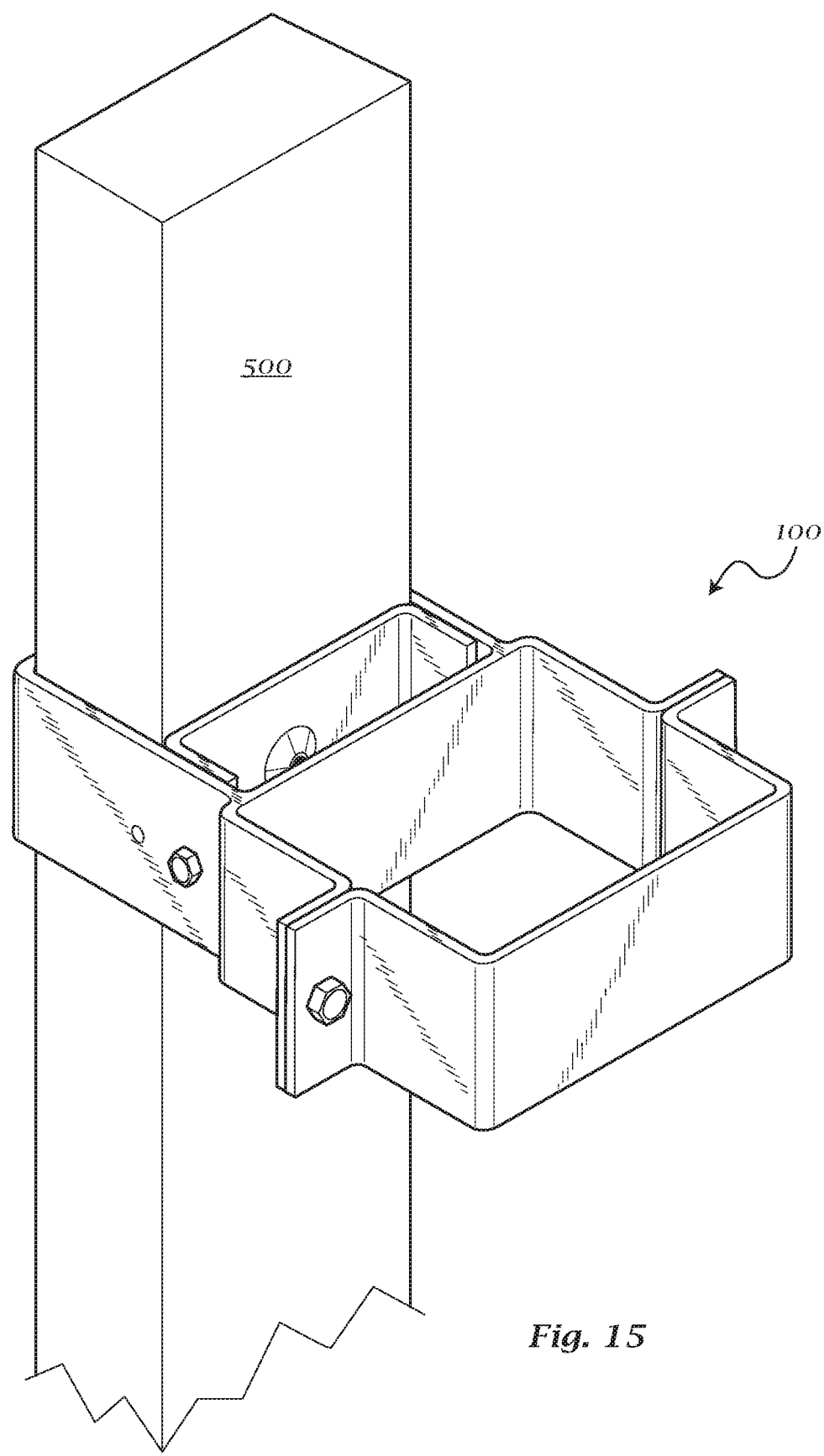
FIG. 15 shows a multi-purpose adjustable bracket assembly; and
Exemplary

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment a multi-purpose, adjustable bracket assembly may be provided. The adjustable bracket may allow for attaching structural features to existing posts, beams, or supports. The adjustable bracket may, for example, facilitate attaching a privacy screen and/or awning to existing railing posts of a deck or balcony. The bracket may further facilitate attachment of decorative latticework, horizontal slats, and/or bamboo partitions.

Now referring to the Figures, a bracket assembly 100 may be provided. Bracket assembly 100 may have a frame 102 defining a first clamping section 110 and a second clamping section 120. First clamping section 110 may have a first receiving channel or first hole 112 defined by frame 102. Receiving channel or hole 112 may be capable of receiving an object 500, such as an existing railing post or support structure. Frame 102 may be adjustable to expand or constrict the size of hole 112, such that clamping section 110 may clamp an object 500 passing through hole 112, as would be understood by a person having ordinary skill in the art. According to an exemplary embodiment, frame 102 may be split or separable along the perimeter of clamping section 110, such that the perimeter of clamping section 110 may be expanded or contracted. In one exemplary embodiment, frame 102 may be split or separable in two places 114, 118 along the perimeter of clamping section 110. Frame 102 may be shaped to form outward flanges 113, 115 at split 114 and flanges 117, 119 at split 118. Flanges 113, 115, 117, and 119 may optionally be integrally formed or may be attached to frame 102. Flanges 113, 115 and flanges 117, 119 may respectively be secured together, forming clamping section 110 and receiving hole 112. In some exemplary embodiments, the flanges may be secured together by any known fastening element 111, including bolts, straps, toggles, clamps, clips, threaded members, integrally formed connectors, or other fastening hardware. Splits 114, 118 may optionally be arranged to divide clamping section 110 substantially in half.

Second clamping section 120 may have a second receiving channel or second hole 122 defined by frame 102. Second clamping section 120 may optionally be immediately adjacent first clamping section 110. In some embodiments, clamping sections 110 and 120 may share a common wall of frame 102. According to some alternative exemplary embodiments, clamping sections 110 and 120 may optionally be spaced apart or conjoined, as would be understood by a person having ordinary skill in the art. Second clamping section 120 may have an adjustable centerpiece or interior narrowing element 130, which may be adjustably positioned within receiving channel 122 in order to appropriately fit and clamp a desired structure or support. Narrowing element 130 may further include at least one tightening element 132 disposed on or through a surface of narrowing element 130 capable of abutting a support object 500. Tightening element 132 may be, for example, a set screw, which can additionally secure an object 500 within channel 122. According to an exemplary embodiment, narrowing element 130 may have a flanges 134, 136 on either side, which may facilitate securing narrowing element 130 in a desired position. For example, bolts or other fastening elements 131 may pass through fastener holes 138 disposed in frame 102 and flanges 134, 136.

According to some exemplary embodiments, clamping sections 110 and 120 may include a padding material disposed on an inner surface of frame 102. The padding material may improve the clamping of an object within clamping section 110 or 120 and may reduce the possibility of damage to the object. The padding 116 may be a dense foam material and may optionally be affixed to frame 102 or narrowing element 130 by adhesive. Clamping section 110 may optionally have a threaded hole disposed through at least one wall for accommodating a set screw.

According to yet further exemplary embodiments, bracket 100 may include a floorplate 140 for supporting a bottom surface of an object, such as a privacy screen support beam, post, or pole. Floorplate 140 may be a flange or solid surface extending across channel 122 to prevent the object from passing all the way through channel 122. Floorplate 140 may be integrally formed or attached to frame 102. Floorplate 140 may extend completely across channel 122 or partially across channel 122 sufficient to prevent a support from sliding all the way through channel 122, as would be understood by a person having ordinary skill in the art. Floorplate 140 may be arranged to allow a structure to pass partially or completely through channel 122 before abutting a surface of floorplate 140.

In an exemplary arrangement, a bracket 100 having a floorplate 140 may be used to hold the bottom of a new or additional support structure, such as a privacy screen post, and an embodiment without floorplate 140 may be used to hold the new support structure at a point higher up the height of the existing deck or balcony structure to which the brackets are applied. Any number of brackets 100 without floorplate 140 may be used to add support along the length of the new support structure, as would be understood by a person having ordinary skill in the art.

Bracket 100 may be made of materials having high strength and durability properties. In some exemplary embodiments, the material may be metal, such as 10-gauge steel. Furthermore, in some embodiments, the bracket assembly may have a powder coat finish to enhance appearance and reduce the possibility of rust residue from being exposed to the elements. Bracket 100 may optionally include precision welding at anchor points to improve strength and durability.

Figure 16:
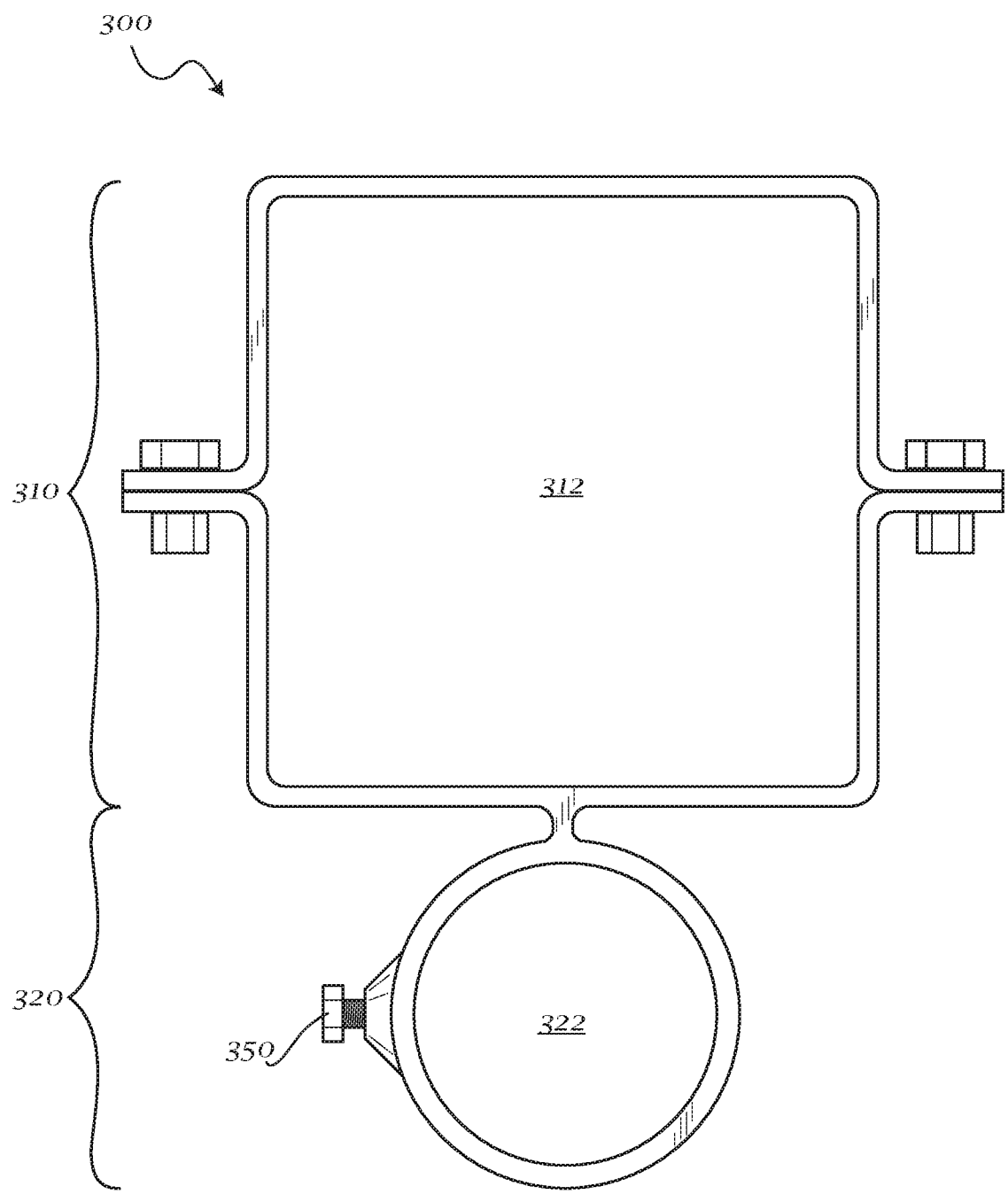
FIG. 16 shows a multi-purpose adjustable bracket assembly.

Now referring to exemplary FIG. 16, a bracket 300 may be shown for securing and/or anchoring a round structure to a rectangular structure, such as a cylindrical post, railing, pole, or other structure as would be understood by a person having ordinary skill in the art. In an exemplary embodiment, bracket 300 may have a clamping section 310 for a rectangular article and a clamping section 320 for a round or circular article. Clamping section 320 may be substantially similar to clamping section 120 or clamping section 220, as described herein. Clamping section 320 may include a set screw 350 for securely clamping an object within clamping section 320. Embodiments of bracket 300 may also include a floorplate for holding the bottom of a support element inserted in channel 322.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:
1. A multi-purpose adjustable bracket comprising:
a frame;
a first clamping section having a first channel disposed therethrough, wherein a perimeter of the first channel is defined by the frame, and wherein the frame is separable along the perimeter of the first channel;
a second clamping section having a second channel disposed therethrough, wherein a perimeter of the second channel is defined by the frame;
a narrowing element adjustably positioned within the second channel; and
a padding element disposed on a surface of at least one of the frame and the narrowing element.

2. The bracket of claim 1, further comprising a set screw disposed through the narrowing element.

3. The bracket of claim 1, further comprising a floorplate disposed at least partially across the second channel.

4. The bracket of claim 1, wherein the frame is separable at two points along the perimeter of the first channel and wherein the frame further comprises flanges at the two points to releasably secure the frame together at the two separable points.

5. The bracket of claim 1, wherein the first clamping section has one of a rectangular or circular cross-section, and wherein the second clamping section has one of a rectangular or circular cross-section.

6. An adjustable bracket arrangement for attaching auxiliary structure to an existing post comprising:
   at least one multi-purpose adjustable bracket comprising:
   a frame;
   a first clamping section having a first channel disposed therethrough, wherein a perimeter of the first channel is defined by the frame, and wherein the frame is separable along the perimeter of the first channel;
   a second clamping section having a second channel disposed therethrough, wherein a perimeter of the second channel is defined by the frame;
   a narrowing element adjustably positioned within the second channel; and
   a padding element disposed on a surface of at least one of the frame and the narrowing.

7. The arrangement of claim 6, wherein at least one of the at least one multi-purpose adjustable brackets further comprises a floorplate disposed at least partially across the second channel.

8. The arrangement of claim 6, wherein the at least one multi-purpose adjustable bracket further comprises a set screw disposed through the narrowing element.

9. The arrangement of claim 6, wherein the first clamping section has one of a rectangular or circular cross-section, and wherein the second clamping section has one of a rectangular or circular cross-section.

* * * * *